Dec. 25, 1945.   T. McG. AIKEN   2,391,377
CAMERA SHUTTER
Filed May 22, 1944   2 Sheets-Sheet 1

INVENTOR.
Thomas McG. Aiken
BY Archworth Martin
His Attorney

Dec. 25, 1945. T. McG. AIKEN 2,391,377
CAMERA SHUTTER
Filed May 22, 1944 2 Sheets-Sheet 2

INVENTOR.
Thomas McG. Aiken
BY Archworth Martin
His Attorney

Patented Dec. 25, 1945

2,391,377

UNITED STATES PATENT OFFICE 2,391,377

CAMERA SHUTTER

Thomas McG. Aiken, Pittsburgh, Pa.

Application May 22, 1944, Serial No. 536,663

5 Claims. (Cl. 95—60)

My invention relates to camera shutters and is here shown and described as applied to shutters of the between-the-lens type.

One object of my invention is to provide shutter apparatus and operating mechanism therefor, of such construction that exposures can be made at a faster speed than is possible with shutters of various other forms, and which is specially suitable for photographing fast-moving objects and in aerial photography.

Another object of my invention is to provide shutter apparatus wherein the shutter blades or discs are moved in only one direction during an exposure operation, and the operating mechanism therefor has no reversal of movement during an exposure operation, thereby avoiding the strain of stopping and reversing movement of the travel of the various movable members.

Still another object of my invention is to provide shutter apparatus of such form that it can readily be placed under such varying degrees of operating tension that exposures of desired duration can be effected.

A further object of my invention is to provide means additional to the shutter, for automatically shutting off the admission of light through a lens aperture immediately after the completion of an exposure, whereby entry of light into the camera is prevented during resetting of the shutter blades for an exposure.

An important feature of the apparatus comprises the use of a pair of shutter blades or discs, each having an aperture or opening therein, which are rotatably driven at different speeds, in such relation that at a given time during the rotation of the blades, their apertures will axially aline in such position that light for an exposure will be admitted through a lens to a light-sensitive surface, the blades being driven at desired rates of speed to thereby vary the length of time during which their apertures are in alinement for an exposure, thus rendering it possible to control the exposure period. The speed at which the blades are driven is controlled through variations in power spring tension and the distance of rotative movement, or the number of revolutions to which they are subjected by the power spring, before their apertures come into alinement at the camera lens.

Figures 2, 4:
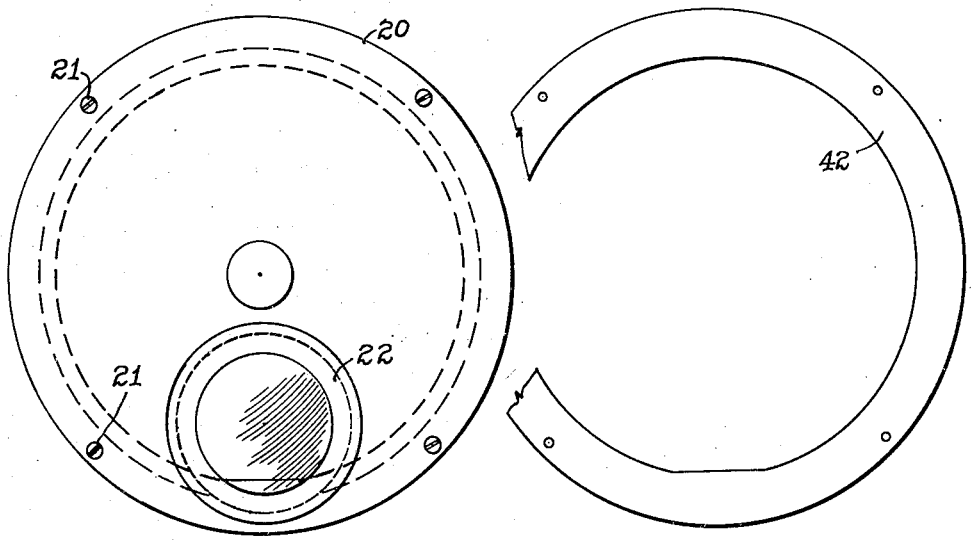
Figure 1:
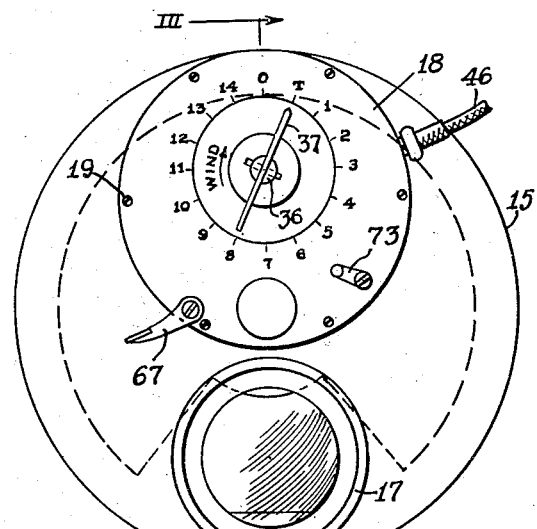
Figure 5:
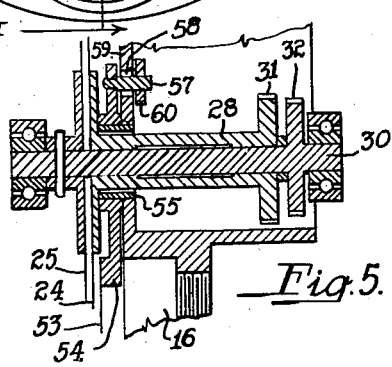
Figure 3:
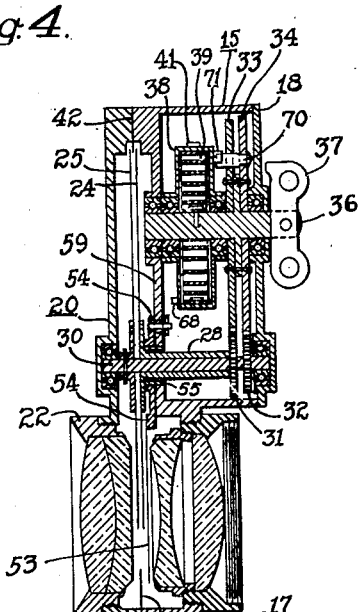
Figures 6, 10:
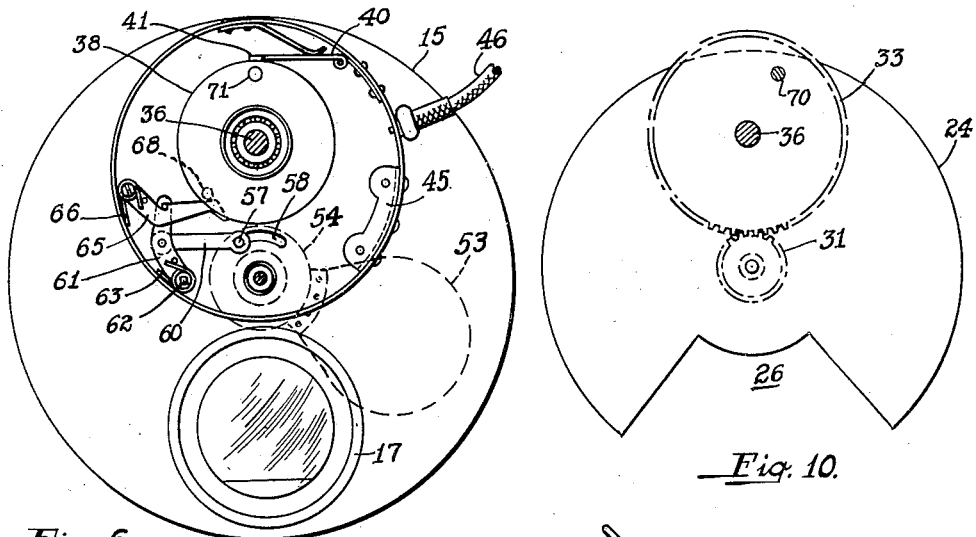
Figures 7, 11:
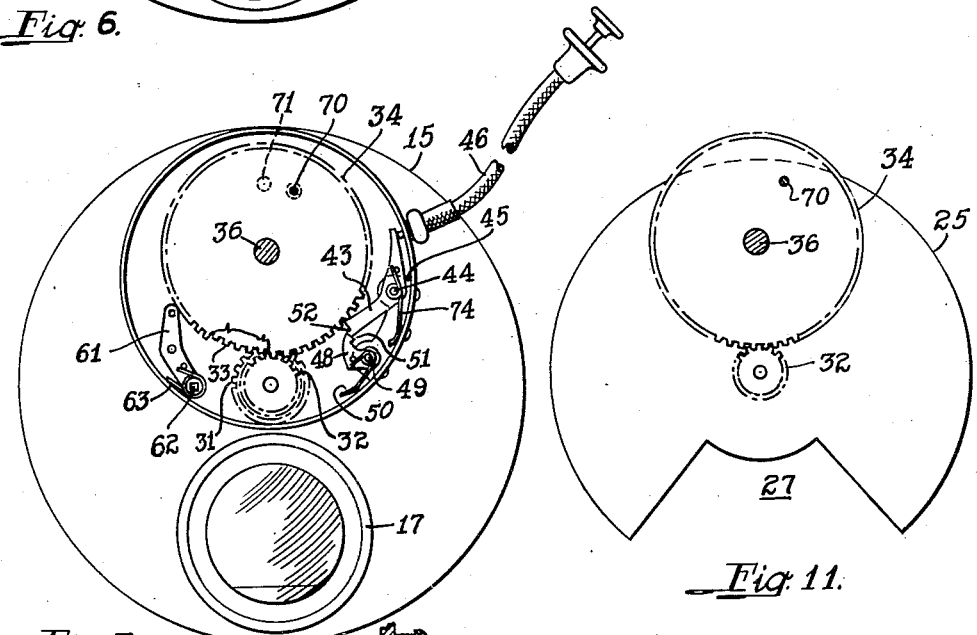
Figures 8, 9:
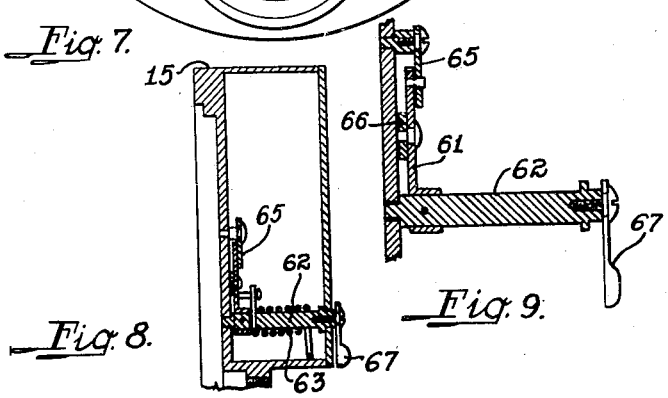

As shown in the accompanying drawings, Figure 1 is a front view of a shutter unit embodying my invention; Fig. 2 is a rear view thereof; Fig. 3 is sectional view taken on the line III—III of Fig. 1; Fig. 4 is a fragmentary view of the spacer or guide ring of Fig. 3; Fig. 5 is a view on an enlarged scale, of a portion of the apparatus of Fig. 3; Fig. 6 is a face view of the unit, with certain of the parts omitted, to expose the mechanism for operating the safety shield that excludes light from the camera; Fig. 7 is a fragmentary face view showing the latching and release mechanism for holding and releasing the shutter discs after they have been tensioned preliminary to an exposure operation; Fig. 8 is an edge view, partly in section, showing the shield-operating elements of Fig. 6; Fig. 9 shows some of the elements of Fig. 8, on an enlarged scale; Fig. 10 is a face view of the front shutter disc of Fig. 3, and the driving gears therefor, and Fig. 11 is a face view of the rear shutter disc and its driving gears.

The shutter unit may be attached to various standard types of cameras, after the manner in which other forms of shutter units are applied thereto, and comprises a casing or housing 15 of generally cylindrical form and having a tubular extension 16 with which a lens holder or barrel 17 has screw threaded connection. A front cover plate 18 is secured to the casing 15 by screws 19, and a rear plate 20 is connected thereto by screws 21. The opposed faces of the members 15 and 20 are recessed as shown in Fig. 3, to accommodate the shutter discs and their supporting elements. A lower portion of the plate 20 has a cylindrical opening with which a lens cell member 22 has threaded engagement, this member being arranged for connection to a camera box or lens board in any well known manner.

It will be understood that diaphragms of any suitable form will be used with the shutter, when desired.

Exposures are effected through the operation of rotary shutter discs 24 and 25, an exposure taking place when their cut-outs 26 and 27, respectively, come into axial alinement with one another, between the lens barrel sections 17 and 22. When either or both of these cut-outs has passed from the lens barrel, the admission of light through the lens is shut off.

The shutter disc 24 is mounted on a tubular shaft 28 that is rotatable on a shaft 30 which is supported in bearings carried by the end walls 18 and 20. The shaft 30 carries the shutter disc 25. Gear wheels 31 and 32 are secured to the shafts 28 and 30, respectively, and are driven by gear wheels 33 and 34, respectively.

The gear wheels 33 and 34 are rigidly secured to a shaft 36 that has a handle 37 by which it is turned to position and place it under spring tension. A spring housing 38 is journaled on the shaft 36 and is connected to one end of a spring 39, the other end of the spring being secured to the shaft 36, so that, with the housing held by a latch 40 and a lug 41 against rotation, clockwise turning of the shaft 36 by its handle 37 will place the spring under tension that will rotate the shaft and the gear wheels when the spring is permitted to expand or unwind. This rotation of the gear wheels imparts rotative movement to the shutter members 24—25.

The gear wheels 33—34 turn as a unit, but since the gear wheels 33 and 31 may have 75 teeth and 25 teeth, respectively, and the gear wheels 34 and 32 may have 80 teeth and 20 teeth respectively, the disc 24 will be given three revolutions during each revolution of the shaft 36, while the disc 25 will revolve four times. Various other gear ratios can obviously be employed, as in my application Ser. No. 564,195, filed November 20, 1944, it being necessary only that the spaces 26 and 27 in the discs come into alinement with one another, in the lens barrel, at a predetermined stage in each revolution of the shaft 36, to thus provide for the making of an exposure.

Since one disc moves faster than the other, the duration of even partial light opening is less than the time required for the space 26 in the disc 24 to pass the lens, since the space 27 in the disc 25 has, in effect, caught up with the slower moving space 26, in the lens barrel, and immediately begins to shut off the light so that before the space 26 has entirely passed from the lens barrel the disc 25 will have cut off the light. This, together with the fact that the discs can be rotated a plurality of revolutions for each exposure, and thus acquire a high speed, enables the making of exposures in perhaps a shorter time than one-thousandth of a second.

A spacer ring or guide collar 42 (Figs. 3 and 4) is held between the casing members and serves as a guide to prevent the shutter discs from catching against one another at their cut-out edges, as might occur through fluttering of these thin discs.

In setting the shutter mechanism under tension preliminary to an exposure, the handle 37 is turned in a clock-wise direction, to rotate the shaft 36. This turning movement causes the spring housing 38 to be pulled by its spring 39 until the stop lug 41 thereon engages the end of the stop member 40 that is pivoted to the casing 15. Continued rotation of the shaft 36 will place the spring 38 under tension while turning the gears, and it will be held at any desired tensioned position by a spring-pressed pawl 43 that is pivoted on a stud 44 that is carried by a plate 45 which is riveted or welded to the housing 15 and engages the teeth of the gear wheel 34, to releasably latch it. A push button or cable release 46 of conventional form is provided for tripping the latch, to release the gear wheel 34.

A latch 48 is pivoted on a stud 49 that is carried by the plate 45 and is biased clockwise by a spring 50, to cause it to engage and hold the pawl 43 out of engagement with the gear wheel 34 after the pawl has been tripped. This holding is effected by a notch 51 in the latch, that engages a shoulder 52 on the pawl.

A safety shield 53 is carried by a collar 54 that is loosely supported for swinging movement on a bushing 55, the shield being shown in Fig. 6 in its open position, to shut off passage of light through the lens barrel, except when the shutter is being operated to make an exposure. A stud 57 is carried by the collar 54 and extends through a slot 58 in the inner wall 59 of the housing 15. A link 60 is pivotally connected to the collar 54 and to a lever 61 that is carried by a shaft 62 which is journaled in the housing and is biased in a clockwise direction (Fig. 6) by a spring 63 so that it will tend to always move the shield 53 toward its lower position, where the light is shut off. A latch 65 that is biased counterclockwise by a spring 66 releasably holds the lever 61 and the shield 53 in the positions shown in Fig. 6, the shield being moved to this position through depression of a handle or lever 67 that is carried by the shaft 62. The shield is moved to this open position after the handle 37 has been turned to place the shutter members 24—25 under operating tension with the shutter members closing the opening through the lens barrel. A stud 68 on the spring drum will trip the latch 65 and allow the shield 53 to be closed under the influence of the spring 63 after the pawl 43 has been tripped and the shutter members 24—25 have been moved past their exposure position. This tripping occurs through counterclockwise movement of the spring housing 38 at the completion of an exposure, as will be hereinafter explained.

The apparatus is operated in the following manner:

With the shield 53 in its operative position within the lens barrel, the handle 37 is turned in a clockwise direction from whatever position it may have occupied after the completion of a previous exposure operation. During this turning movement, the spring housing 38 will be turned to the position shown in Fig. 6 where it is held by the stop bar 40 against further clockwise movement. Continued turning of the handle 37 places the spring 39 under tension. At the point T on the dial of Fig. 1, the openings 26 and 27 of the shutter will be in registry within the lens barrel, but no exposure results, because the shield 53 is in its lower position. Continued turning of the handle increases the tension and the pawl 43 will, at the same time, be riding over the teeth of the gear wheel 34. From point 1 to point 14 on the scale, the spring will be placed under increasing tension, but after the point of the handle 37 passes 14 on the scale, a stud 70 that extends through the gear wheels 33—34 will come behind a stud 71 on the spring housing 38 (this stud 70 being shown in front of the stud 71 in Figs. 3 and 7, for a purpose to be hereinafter explained). The limit of handle turning movement and spring tensioning is at 14 on the scale.

The lever 67 is then depressed to swing the shield 53 to its open position and latch it there as shown in Fig. 6. Thereupon the cable release 46 is operated to release the pawl 43 so that the spring 39 will rotate the shaft 36 and the gear wheels. The shutter members 24—25 will thereby be given a plurality of revolutions as above explained, until the pointer on the handle 37 reaches approximately the point T on the scale, at which time the openings 26—27 are in registry. When the pointer reaches 0 on the scale, the shutter openings will be out of registry; at that time the stud 68 on the spring drum 38 will trip the latch 65 to release the shield 53 and permit it to close the lens opening. When the pawl 43 is tripped as above mentioned, it will be held in its disengaged position by the latch 48 as above explained, to permit free movement of the gear wheel 34. A crank arm 73 connected with the latch 48 is employed to turn the latch and release the pawl 43 so that it may be returned to its operative position by its spring 74, preliminary to again setting the shutter under tension.

The operation of the shutter by the fully tensioned power spring as above described makes for an exposure period of very short duration, since there will be acceleration of the rotative speeds of the shutter discs 24 and 25 during several revolutions which are required in order to bring their openings 26—27 into registry in the lens barrel. If the handle 37 is turned to position 1 on the dial, the tension on the shutter members 24—25 will not be very great, and their movement during the exposure range will consequently be slow. With the handle turned to successive points on the dial, the spring tension will be correspondingly increased with consequently greater acceleration and faster travel of the shutter members when they are passing the exposure zone.

Turning of the gear wheels 33—34 in a counterclockwise direction under the influence of the power spring 39, when making an exposure operation, will bring the stud 70 of the gear wheel 33 against the forward side of the stud 71 on the spring housing, as shown in Fig. 3, and the momentum of the gear wheels will be transmitted to the spring housing which is thereby moved away from the stop bar 40. This feature is advantageous as a means of gradually bringing the gear wheels and other moving parts to rest without shock, particularly when the power spring has been placed under considerable tension for a short exposure. The gear wheels and the spring housing can, at this time, turn idly until they come to rest. In resetting the mechanism for another exposure, the handle 37 will simply be turned until the spring housing 38 is brought to the stop position shown in Fig. 6, whereupon continued movement of the handle will place the power spring under gradually increasing tension, to provide for a desired extent of rotative travel and acceleration; the duration of exposure being determined by the degree of spring tension and the distance of accelerative movement, as above explained.

I claim as my invention:

1. Shutter apparatus for use in conjunction with the exposure aperture of a camera, comprising a casing, a pair of shutter members mounted therein for rotation relative to each other, and having openings therethrough that are moved past the aperture during rotation of the members, to permit passage of light through the aperture when the openings are alined with one another at the aperture, a rotatably-mounted shaft, a coiled power spring surrounding the shaft and having its inner end fixedly secured to the shaft, a rotatably-mounted spring housing surrounding the spring and secured to the outer end thereof, transmission gear wheels arranged to transmit rotative movements from the shaft to the shutter members at different relative rates, and to bring said openings into registry at the aperture for an exposure at a predetermined rotative position of the shaft, stop members on the casing and the housing, respectively, arranged to limit rotative movements of the housing in one direction, during turning of the shaft to tension the power spring, but relatively yieldable to allow rotation of the housing in the opposite direction, a stud on the housing, a stud on one of the gear wheels positioned to engage the stud on the housing when the shutter openings have passed out of registry with the aperture, during rotation of the gear wheels by the power spring, thereby rotating the housing in the opposite direction, a light shield, and means automatically operated during movement of the gear wheels following an exposure, for moving the shield from an inoperative position into position to close the aperture.

2. Shutter apparatus for use in conjunction with the exposure aperture of a camera, comprising a casing, a pair of shutter members mounted therein for rotation relative to each other, and having openings therethrough that are moved past the aperture during rotation of the members, to permit passage of light through the aperture when the openings are alined with one another at the aperture, a rotatably-mounted shaft, a coiled power spring surrounding the shaft and having its inner end fixedly secured to the shaft, a rotatably-mounted spring housing surrounding the spring and secured to the outer end thereof, transmission gear wheels arranged to transmit rotative movements from the shaft to the shutter members at different relative rates, and to bring said openings into registry at the aperture for an exposure at a predetermined rotative position of the shaft, stop members on the casing and the housing, respectively, arranged to limit rotative movements of the housing in one direction, during turning of the shaft, to tension the power spring, but relatively yieldable to allow rotation of the housing in the opposite direction, a stud on the housing, a stud on one of the gear wheels positioned to engage the stud on the housing when the shutter openings have passed out of registry with the aperture, during rotation of the gear wheels by the power spring, thereby rotating the housing in the opposite direction, a light shield, and means for moving the shield into lens-capping position, and a stud on the housing positioned to actuate this shield-moving means, during movements of the housing in said opposite direction.

3. Shutter apparatus for use in conjunction with the exposure aperture of a camera, comprising a casing, a pair of shutter members mounted therein for rotation relative to each other, and having openings therethrough that are moved past the aperture during rotation of the members, to permit passage of light through the aperture when the openings are alined with one another at the aperture, a rotatably-mounted shaft, a coiled power spring surrounding the shaft and having its inner end fixedly secured to the shaft, a rotatably-mounted spring housing surrounding the spring and secured to the outer end thereof, transmission gear wheels arranged to transmit rotative movements from the shaft to the shutter members at different relative rates, and to bring said openings into registry at the aperture for an exposure at a predetermined rotative position of the shaft, stop members on the casing and the housing, respectively, arranged to limit rotative movements of the housing in one direction, during turning of the shaft to tension the power spring, but disengageable to permit rotation of the housing in the opposite direction when the spring tension is spent, a dial on the casing, a pointer and handle on the spring shaft, movable along the dial, and so related thereto that during an initial range of spring-winding movement of the shaft, and after the said stop members have engaged each other, the pointer and the dial will indicate when the shutter members have been moved to positions at which their openings are in registry at the aperture, and will indicate the extent to which the spring tension is increased and the shaft rotated through further winding the spring, a light shield, and means automatically operated during movement of the shutter members under spring tension and during movement of the pointer in the reverse direction, after backwardly passing said range, for moving the shield from an inoperated position into position to close the aperture.

4. Shutter apparatus for use in conjunction with the exposure aperture of a camera, comprising a casing, a pair of shutter members mounted therein for rotation relative to each other, and having openings therethrough that are moved past the aperture during rotation of the members, to permit passage of light through the aperture when the openings are alined with one another at the aperture, a rotatably-mounted shaft, a coiled power spring surrounding the shaft and having its inner end fixedly secured to the shaft, means fixedly holding the outer end of the spring when it is held under tension, gear wheels arranged to transmit rotative movements from the shaft to the shutter members at different relative rates, and to bring said openings into registry at the aperture for an exposure at a predetermined rotative position of the shaft, a dial on the casing, a pointer and handle rigidly mounted on the spring shaft and movable along the dial, and so related thereto that during an initial range of spring-winding movement of the shaft the pointer and the dial will indicate when the shutter members have been moved to positions at which their openings are in registry at the aperture, and will indicate the extent to which the spring tension is increased and the shaft and shutter members rotated through further winding of the spring, a light shield, and means automatically operated during movement of the shutter members under spring tension and during movement of the pointer after backwardly passing said range, for moving the shield from an inoperative position into position to close the aperture.

5. Shutter apparatus for use in conjunction with the exposure aperture of a camera, comprising a casing, a pair of shutter members mounted therein for rotation relative to each other, and having openings therethrough that are moved past the aperture during rotation of the members, to permit passage of light through the aperture when the openings are alined with one another at the aperture, a rotatably-mounted shaft, a coil power spring surrounding the shaft and having its inner end fixedly secured to the shaft, means fixedly holding the outer end of the spring when it is held under tension, gear wheels arranged to transmit rotative movements from the shaft to the shutter members at different relative rates, and to bring said openings into registry at the aperture for an exposure at a predetermined rotative position of the shaft, a dial on the casing, a pointer and handle rigidly mounted on the spring shaft and movable along the dial, and so related thereto that during an initial range of spring-winding movement of the shaft the pointer and the dial will indicate when the shutter members have been moved to positions at which their openings are in registry at the aperture, and will indicate the extent to which the spring tension is increased and the shaft and shutter members rotated through further winding of the spring, a light shield, means automatically operated during movement of the shutter members under spring tension and during movement of the pointer after backwardly passing said range, for moving the shield from an inoperative position into position to close the aperture, and means for retarding further movement of the shutter members after the pointer has passed backwardly through said range.

THOMAS McG. AIKEN.